United States Patent
Klein et al.

(10) Patent No.: US 9,002,942 B2
(45) Date of Patent: Apr. 7, 2015

(54) PROCESSING CONTENT SPOILERS

(71) Applicant: Google Inc., Mountain View, CA (US)

(72) Inventors: Daniel Victor Klein, Pittsburgh, PA (US); Dean Kenneth Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 13/647,244

(22) Filed: Oct. 8, 2012

(65) Prior Publication Data
US 2014/0101244 A1 Apr. 10, 2014

(51) Int. Cl.
*G06F 15/16* (2006.01)
*G06Q 10/00* (2012.01)
*G06Q 50/00* (2012.01)

(52) U.S. Cl.
CPC ............. *G06Q 10/00* (2013.01); *G06Q 50/01* (2013.01)

(58) Field of Classification Search
CPC . G06F 17/241; G06F 15/16; G06F 17/30038; G06F 3/03545; H04L 65/403
USPC .................. 709/204, 203, 205–207, 217–219
See application file for complete search history.

(56) References Cited

U.S. PATENT DOCUMENTS

| | | | |
|---|---|---|---|
| 2009/0214191 A1* | 8/2009 | Allard | 386/124 |
| 2011/0047117 A1 | 2/2011 | Sinha | |
| 2012/0036423 A1* | 2/2012 | Haynes et al. | 715/230 |
| 2012/0072941 A1* | 3/2012 | Thornberry et al. | 725/14 |
| 2012/0191764 A1* | 7/2012 | Leibu et al. | 707/821 |
| 2013/0275519 A1* | 10/2013 | Nichols | 709/206 |

FOREIGN PATENT DOCUMENTS

| | | |
|---|---|---|
| KR | 10-2010-0031595 A | 3/2010 |
| KR | 10-2011-0136308 A | 12/2011 |
| KR | 10-2012-0087248 A | 8/2012 |

OTHER PUBLICATIONS

International Search Report and Written Opinion for PCT/US2013/083735, mailed Jan. 23, 2014, 12 pages.

* cited by examiner

*Primary Examiner* — Ruolei Zong
(74) *Attorney, Agent, or Firm* — Patent Law Works LLP

(57) ABSTRACT

The disclosure includes a system and method for processing content spoilers. The system includes a controller, a progress module, a determination module, a warning module and a presentation module. The controller receives activity data describing an activity performed by a first user and content data published by a second user. The progress module determines a first progress stage for a subject associated with the activity based at least in part on the activity data. The determination module determines whether the content data includes a spoiler for the first user based at least in part on the first progress stage. Responsive to the determination that the content data includes the spoiler, the warning module obscures the content data published by the second user from the first user and generates a spoiler warning. The presentation module provides the spoiler warning to the first user.

20 Claims, 10 Drawing Sheets

PROCESSING CONTENT SPOILERS

BACKGROUND

The specification relates to providing content to users. In particular, the specification relates to processing content spoilers.

Over the last decade, social networking has become increasingly popular. People frequently share information (e.g., videos, posts, comments, photos, movie reviews, book reviews, etc.) with other users in a social network. However, the information shared by a user may include spoilers for other users. For example, if a user publishes a post describing the unexpected ending of a movie in the user's social stream, this post may spoil the movie's surprise to other users who have not viewed the movie yet. On the other hand, if a user knows that another user can provide the spoiling information, the user can explicitly ask the other user for the spoilers. For example, assume a user has read the first two chapters of a book and may be very anxious to know what happens at the end of the story. If the user learns that a friend has finished reading the book, the user may ask the friend privately to provide information about the end of the story without spoiling the surprise for other users in a group.

SUMMARY

According to one innovative aspect of the subject matter described in this disclosure, a system for processing content spoilers includes: a controller for receiving activity data describing an activity performed by a first user and content data published by a second user; a progress module for determining a first progress stage for a subject associated with the activity based at least in part on the activity data; a determination module for determining whether the content data includes a spoiler for the first user based at least in part on the first progress stage; a warning module for obscuring the content data published by the second user from the first user responsive to the determination that the content data includes the spoiler, the warning module generating a spoiler warning indicating that the obscured content data includes the spoiler; and a presentation module for providing the spoiler warning to the first user.

In general, another innovative aspect of the subject matter described in this disclosure may be embodied in methods that include receiving activity data describing an activity performed by a first user; determining a first progress stage for a subject associated with the activity based at least in part on the activity data; receiving content data published by a second user; determining whether the content data includes a spoiler for the first user based at least in part on the first progress stage; responsive to determining that the content data includes the spoiler, obscuring the content data published by the second user from the first user; generating a spoiler warning indicating that the obscured content data includes the spoiler; and providing the spoiler warning to the first user.

Other aspects include corresponding methods, systems, apparatus, and computer program products for these and other innovative aspects.

These and other implementations may each optionally include one or more of the following features. For instance, the operations include: receiving input data from the first user describing the subject and the first progress stage associated with the activity; configuring the first progress stage and the subject for the activity based at least in part on the input data; receiving inquiry data from the first user to request a second progress stage of the subject associated with the second user; retrieving data describing the second progress stage associated with the second user responsive to receiving the inquiry data; presenting the second progress stage to the first user; receiving a confirmation signal responsive to the spoiler warning from the first user, the confirmation signal indicating that the first user confirms to view the obscured content data; presenting the obscured content data to the first user; and presenting a progress indicator indicating the first progress stage of the first user to one or more of the first user and the second user. For instance, the features include: the first user and the second user as members of a group related to the subject; determining whether the content data refers to the subject of the activity; responsive to determining that the content data refers to the subject, determining a second progress stage for the subject from the content data; and determining whether the content data includes the spoiler by comparing the first progress stage associated with the activity to the second progress stage associated with the content data.

The present disclosure may be particularly advantageous in a number of respects. First, the system can determine progress stages associated with a subject for members in a group. For example, the system can determine and display how far each member in a group may be in reading a book, which may give each member social pressure to read the book according to the schedule and may encourage the members to keep up without waiting for the last minute to skim through the book. Second, the system can automatically determine content spoilers and prevent content spoilers delivered to a user without the user's confirmation. Third, the system may allow a user to explicitly request for spoilers from other users. For example, the system provides a user with progress stages of other users associated with a book, which allows the user to ask the other users that have finished reading the book for spoilers.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
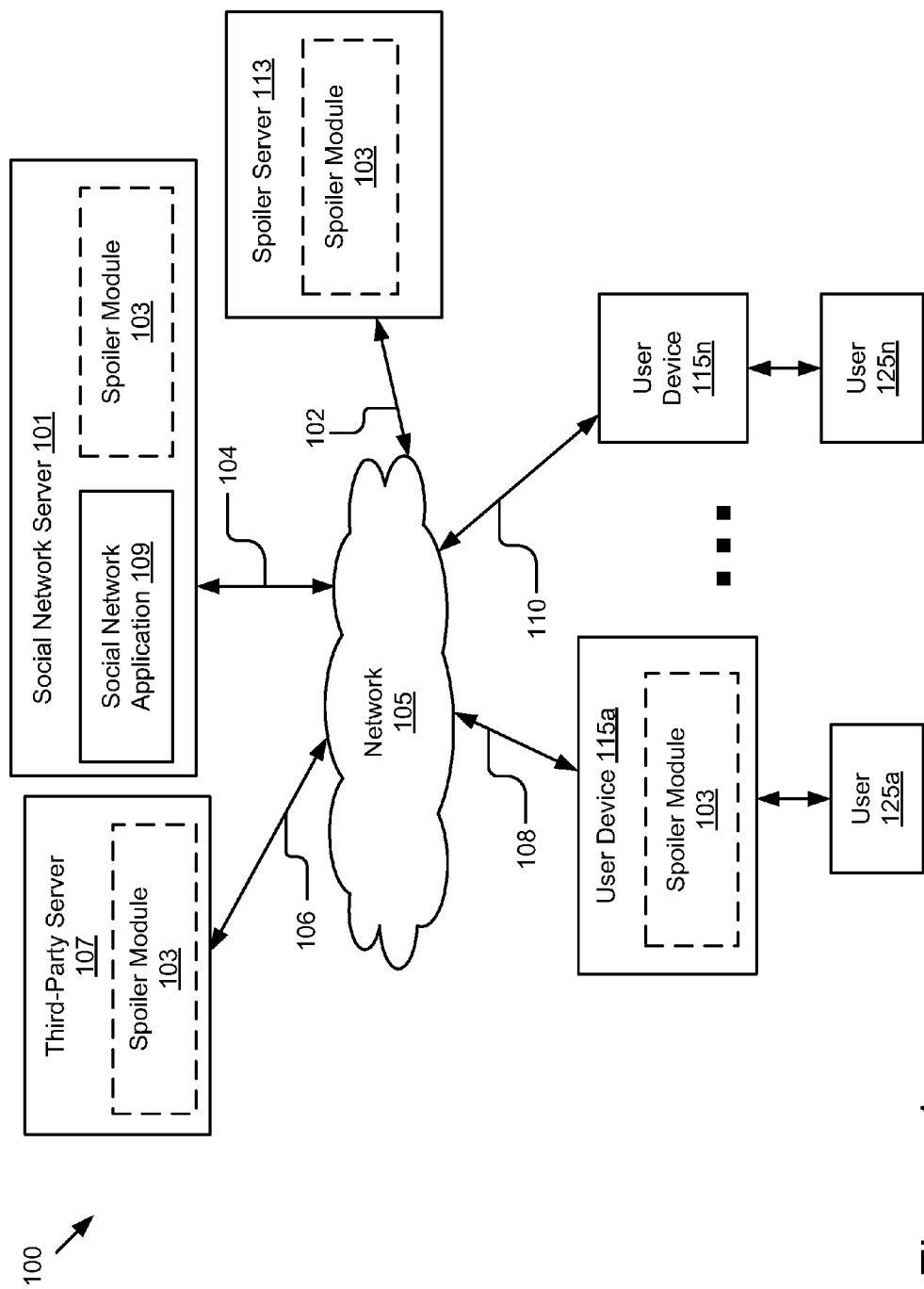
FIG. 1 is a block diagram illustrating an example system for processing content spoilers.

FIG. 1 illustrates a block diagram of some implementations of a system 100 for processing content spoilers. The illustrated system 100 includes user devices 115*a* . . . 115*n* that can be accessed by users 125*a* . . . 125*n*, a social network server 101, a third-party server 107 and a spoiler server 113. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In the illustrated implementation, these entities of the system 100 are communicatively coupled via a network 105.

The user devices 115a, 115n in FIG. 1 are used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the third-party server 107 and the spoiler server 113, in practice one or more networks 105 can be connected to these entities.

In some instances, the spoiler module 103 may be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the spoiler server 113 and the third-party server 107 via the network 105. The social network server 101 includes a social network application 109. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

In some instances, the spoiler module 103 may be stored on a third-party server 107, which is connected to the network 105 via signal line 106. In some implementations, the third-party server 107 can be a hardware server that includes a processor, a memory and network communication capabilities. The third-party server 107 sends and receives data to and from other entities of the system 100 via the network 105. While FIG. 1 includes one third-party server 107, the system 100 may include one or more third-party servers 107.

In some instances, the spoiler module 103 may be stored on a spoiler server 113, which is connected to the network 105 via signal line 102. In some implementations, the spoiler server 113 can be a hardware server that includes a processor, a memory and network communication capabilities. The spoiler server 113 sends and receives data to and from other entities of the system 100 via the network 105. While FIG. 1 includes one spoiler server 113, the system 100 may include one or more spoiler servers 113.

In some instances, the spoiler module 103 may be stored on a user device 115a, which is connected to the network 105 via signal line 108. In some implementations, the user device 115a, 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user 125a interacts with the user device 115a. The user device 115n is communicatively coupled to the network 105 via signal line 110. The user 125n interacts with the user device 115n. In some instances, the spoiler module 103 acts in part as a thin-client application that may be stored on the user devices 115a, 115n and in part as components that may be stored on one or more of the social network server 101, the spoiler server 113 and the third-party server 107.

The spoiler module 103 can be code and routines for processing spoilers included in content. In some instances, the spoiler module 103 can be implemented using hardware including a field-programmable gate array (FPGA) or an application-specific integrated circuit (ASIC). In some other instances, the spoiler module 103 can be implemented using a combination of hardware and software. In some instances, the spoiler module 103 may be stored in a combination of the devices and servers, or in one of the devices or servers.

In some instances, the spoiler module 103 receives activity data describing an activity performed by a first user. The spoiler module 103 determines a subject of the activity and a progress stage for the subject associated with the activity based at least in part on the activity data. For example, if the activity data describes that a first user has paused playing a movie, the spoiler module 103 determines a progress stage associated with the movie for the first user indicating that the first user has started viewing the movie and stopped in the middle of the movie.

In some implementations, a subject for an activity can be a media topic. For example, a subject can be a specific book, a specific movie and/or a specific story, etc. In some implementations, a progress stage may include data describing a stage of a subject that a user may be involved in. For example, a progress stage indicates that a user has read only the first chapter of a specific book.

In some instances, the spoiler module 103 receives content data from a second user. The content data may include data (e.g., a message, a post, a comment, an email, etc.) referring to the subject of the activity. The spoiler module 103 determines whether the content data includes a spoiler for the first user based at least in part on the progress stage of the first user. For example, if the content data refers to a movie and a progress stage of the first user indicates that the first user has not viewed the movie yet, the spoiler module 103 determines that the content data from the second user includes a spoiler for the first user.

In some implementations, a spoiler may include data that spoils surprise and/or suspense of a subject. For example, if a user has not viewed a movie yet, the content data including descriptions of the last scene of the movie can be a spoiler for the user. A spoiler included in the content data may also be referred to as a content spoiler herein.

In some instances, if the spoiler module 103 determines a spoiler for the first user from the content data, the spoiler module 103 obscures the content data from the first user. For example, the spoiler module 103 may hide the content data from the first user. The spoiler module 103 generates a spoiler warning for the first user and provides the spoiler warning to the first user. For example, the spoiler module 103 generates a message and/or an email indicating that the content data may include a spoiler, and sends the message and/or the email to the first user. If the first user confirms to view the obscured content data even if the content data may include a spoiler, the spoiler module 103 presents the content data to the first user. The spoiler module 103 is described below in more detail with reference to FIGS. 2-5.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
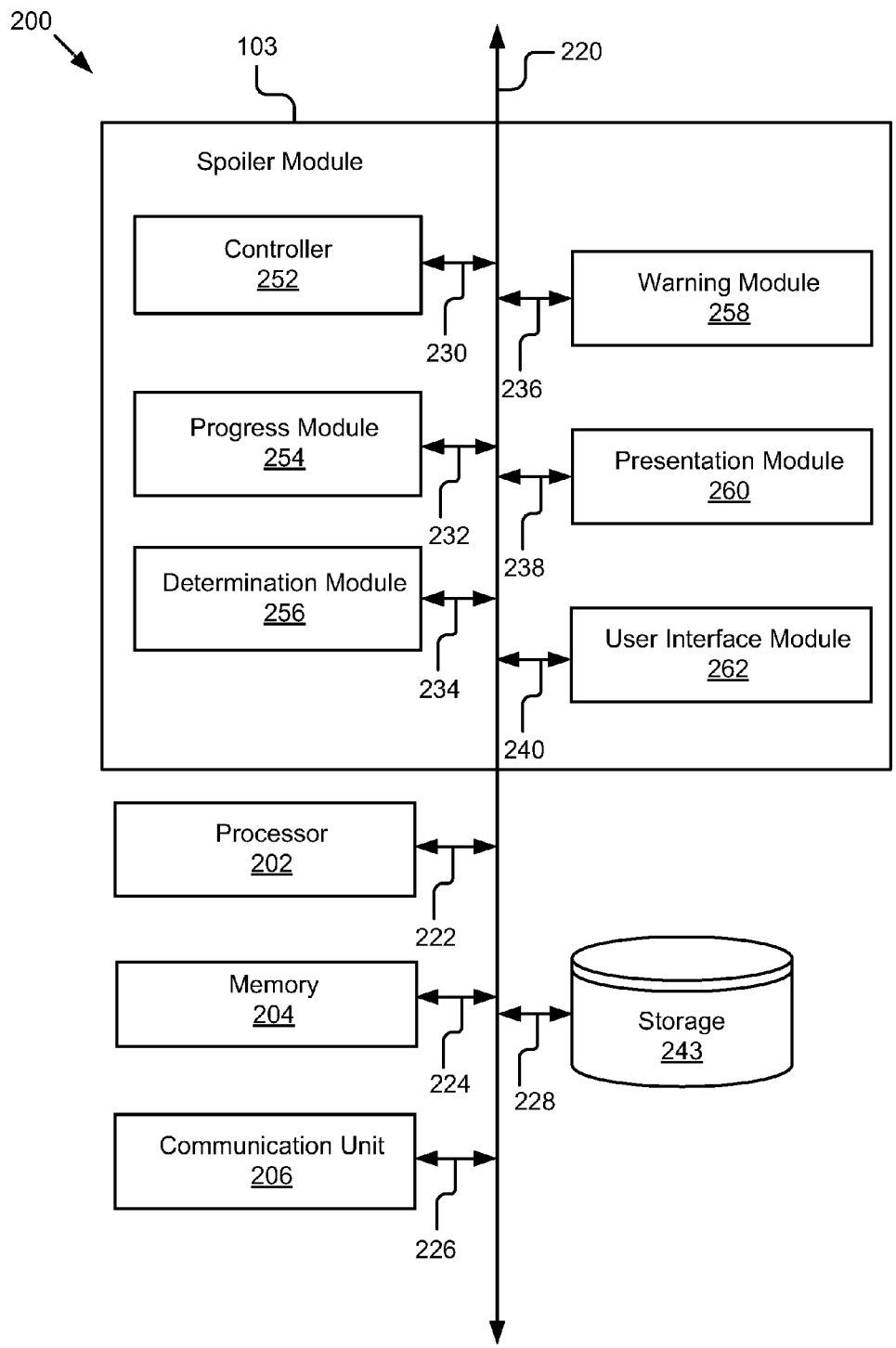
FIG. 2 is a block diagram illustrating an example of a spoiler module.

Referring now to FIG. 2, an example of the spoiler module 103 is shown in more detail. FIG. 2 is a block diagram of a computing device 200 that includes a spoiler module 103, a processor 202, a memory 204, a communication unit 206 and a storage device 243 according to some examples. The components of the computing device 200 are communicatively coupled by a bus 220. In some instances, the computing device 200 can be one of a social network server 101, a user device 115, a spoiler server 113 and a third-party server 107.

The processor 202 includes an arithmetic logic unit, a microprocessor, a general purpose controller or some other processor array to perform computations and provide electronic display signals to a display device. The processor 202 is coupled to the bus 220 for communication with the other components via signal line 222. Processor 202 processes data signals and may include various computing architectures including a complex instruction set computer (CISC) architecture, a reduced instruction set computer (RISC) architecture, or an architecture implementing a combination of instruction sets. Although FIG. 2 includes a single processor 202, multiple processors 202 may be included. Other processors, operating systems, sensors, displays and physical configurations are possible.

The memory 204 stores instructions and/or data that may be executed by the processor 202. The memory 204 is coupled to the bus 220 for communication with the other components via signal line 224. The instructions and/or data may include code for performing the techniques described herein. The memory 204 may be a dynamic random access memory (DRAM) device, a static random access memory (SRAM) device, flash memory or some other memory device. In some instances, the memory 204 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 206 transmits and receives data to and from at least one of the user device 115, the third-party server 107, the spoiler server 113 and the social network server 101 depending upon where the spoiler module 103 may be stored. The communication unit 206 is coupled to the bus 220 via signal line 226. In some instances, the communication unit 206 includes a port for direct physical connection to the network 105 or to another communication channel. For example, the communication unit 206 includes a USB, SD, CAT-5 or similar port for wired communication with the user device 115. In some instances, the communication unit 206 includes a wireless transceiver for exchanging data with the user device 115 or other communication channels using one or more wireless communication methods, including IEEE 802.11, IEEE 802.16, Bluetooth® or another suitable wireless communication method.

In some instances, the communication unit 206 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 206 includes a wired port and a wireless transceiver. The communication unit 206 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some instances, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 via signal line 228.

In some instances, the storage device 243 stores activity data describing activities performed by one or more users. For example, the storage device 243 stores activity data describing that a user has viewed a media file (e.g., a video, a movie). In some implementations, the activity data describes one or more of the following: that a user rates a movie and/or a book; that a user joins a conversation thread to make comments on scenes of a movie and/or a book; that a user joins a conversation thread to express an intention to view a movie; that a user reads a book on a reader device; that a user posts a review for a book; that a user views a movie on a television; and that a user buys a book and/or movie from an online store, etc.

In some instances, the storage device 243 stores progress data describing one or more progress stages for one or more subjects associated with a user. For example, the progress data describes a first progress stage indicating that a user has viewed a movie and a second progress stage indicating that the user has read the first two chapters of a book. In some implementations, the progress data describes progress stages for a subject associated with a group of users. For example, the progress data describes a first progress stage indicating that a first user from a reading group has read the first two chapters of a book and a second progress stage indicating that a second user from the same reading group has read the first three chapters of the book.

In some instances, the storage device 243 stores spoiler data describing one or more spoilers for a user. For example, the storage device 243 stores spoiler data indicating that a post from a friend may include a spoiler for a user. In some instances, the storage device 243 stores content data published by one or more users. For example, the storage device 243 stores posts and/or comments published by one or more users upon the consent of the users. In some instances, the storage device 243 stores group data describing one or more groups. For example, the storage device 243 stores group data describing one or more members in a group. The storage device 243 may store other data for providing the functionality described herein.

In the illustrated implementation shown in FIG. 2, the spoiler module 103 includes a controller 252, a progress module 254, a determination module 256, a warning module 258, a presentation module 260 and a user interface module 262. These components of the spoiler module 103 are communicatively coupled to each other via the bus 220.

The controller 252 can be software including routines for handling communications between the spoiler module 103 and other components of the computing device 200. In some instances, the controller 252 can be a set of instructions executable by the processor 202 to provide the functionality described below for handling communications between the spoiler module 103 and other components of the computing device 200. In some other instances, the controller 252 can be stored in the memory 204 of the computing device 200 and can be accessible and executable by the processor 202. The controller 252 may be adapted for cooperation and communication with the processor 202 and other components of the computing device 200 via signal line 230.

The controller 252 sends and receives data, via the communication unit 206, to and from one or more of a user device 115, a spoiler server 113, a social network server 101 and a third-party server 107. For example, the controller 252 receives, via the communication unit 206, a progress inquiry for querying progress stages of a book for each member in a reading group from a user device 115 and sends the progress inquiry to the progress module 254. In another example, the controller 252 receives graphical data for providing a user interface to a user from the user interface module 262 and sends the graphical data to a user device 115, causing the user device 115 to present the user interface to the user.

In some instances, the controller 252 receives data from components of the spoiler module 103 and stores the data in the storage device 243. For example, the controller 252 receives spoiler data describing one or more spoilers from the determination module 256 and stores the spoiler data in the storage device 243. In some instances, the controller 252 retrieves data from the storage device 243 and sends the data to components of the spoiler module 103. For example, the controller 252 retrieves progress data describing one or more progress stages for users in a group from the storage device 243 and sends the progress data to the progress module 254.

The progress module 254 can be software including routines for determining a progress stage associated with a subject for a user. In some instances, the progress module 254 can be a set of instructions executable by the processor 202 to provide the functionality described below for determining a progress stage associated with a subject for a user. In some other instances, the progress module 254 can be stored in the memory 204 of the computing device 200 and can be accessible and executable by the processor 202. The progress module 254 may be adapted for cooperation and communication with the processor 202 and other components of the computing device 200 via signal line 232.

In some instances, the progress module 254 receives, via the controller 252, activity data describing an activity performed by a user from a user device 115. For example, a user manually inputs activity data via a user interface presented on a user device 115 and sends the activity data to the progress module 254 by clicking on a confirmation button shown in the user interface. In some instances, a user device 115 automatically provides the activity data to the progress module 254 upon the consent of a user. For example, if a privacy setting of a reader device indicates that a user authorizes the reader device to report his reading activities and/or reading progress stages automatically to the spoiler module 103, the reader device sends the activity data and/or the reading progress stages to the progress module 254. In another example, if a privacy setting of a movie player indicates that a user authorizes the movie player to report his viewing activities and/or viewing progress stages automatically to the spoiler module 103, the movie player sends the activity data and/or the viewing progress stages to the progress module 254.

In some instances, the progress module 254 receives activity data associated with a user from a content provider (e.g., a video hosting site, a reading site, a movie site, etc.) upon the consent of the user. For example, a user views a TV show on a video hosting site and authorizes the video hosting site to automatically report his activities and/or progress stages related to the TV show to the spoiler module 103. Upon the consent of the user, the video hosting site sends the user's activity data and/or progress stages to the progress module 254.

The progress module 254 determines a subject associated with the activity and a progress stage associated with the subject for the user based at least in part on the activity data. For example, the progress module 254 receives, via the controller 252, activity data describing that a user has bookmarked the beginning of the third chapter of a book on a reader device. The progress module 254 determines a subject associated with the activity as the book, and a progress stage for the user as: the user has read at least the first two chapters of the book. In another example, the progress module 254 receives activity data from a social network server 101 describing that a user has joined a conversation thread to express an intention to watch a movie next weekend. The progress module 254 applies natural language processing techniques (e.g., machine learning, etc.) to parse the activity data and determines that the activity data relates to the movie subject. The progress module 254 determines a progress stage for the user as: the user has not viewed the movie yet.

In some instances, the progress module 254 instructs the user interface module 262 to generate graphical data for providing a user interface to a user. The user interface may allow the user to input a subject of an activity and a progress stage for the subject manually. For example, a user may input, via the user interface, data describing that he or she has watched the second episode of a TV show. The progress module 254 configures the subject and the progress stage associated with the subject for the user based at least in part on the input data.

In some instances, the progress module 254 instructs the presentation module 260 to present the progress stage to the user. In some instances, the progress module 254 stores the progress stage of the user associated with the subject in the storage device 243.

In some instances, the progress module 254 receives privacy data from a user operating on a user device 115, and configures a privacy setting for the user based on the privacy data. For example, a privacy setting indicates one or more types of activities and/or progress stages that a user wants to share with other users and one or more types of activities and/or progress stages that the user does not want to share to other users. In another example, a privacy setting indicates that a user declines to share activities and/or progress stages with other users. In yet another example, a privacy setting indicates one or more other users or one or more groups that a user specifies to share activities and/or progress stages. In yet another example, a privacy setting indicates that the activities and/or progress stages may be shown to a user privately without sharing with other users.

The progress module 254 instructs the presentation module 260 to present the user's activities and/or progress stages based at least in part on the privacy setting. For example, if a privacy setting indicates that a user declines to share activities with other users, the progress module 254 instructs the presentation module 260 not to present activities and/or progress stages associated with the user to other users. In another example, if a privacy setting indicates that a user shares activities with a specified group, the progress module 254 instructs the presentation module 260 to present activities and/or progress stages associated with the user to the specified group.

In some instances, the progress module 254 receives, via the controller 252, inquiry data describing a progress inquiry from a user device 115 operated by a first user. The progress inquiry may include a subject and an identifier of a second user whose progress stage the first user intends to inquire. The progress module 254 determines the subject related to the progress inquiry from the inquiry data and retrieves a progress stage of the second user associated with the subject from the storage device 243. For example, if a progress inquiry indicates that a first user would like to know a progress stage associated with a second user for a book, the progress module 254 determines the subject as the book and retrieves progress data describing the progress stage of the second user associated with the book from the storage device 243. The progress module 254 instructs the presentation module 260 to present the progress stage associated with the second user to the first user.

In some other instances, the progress module 254 receives a progress inquiry from a user device 115 operated by a user. The progress inquiry may include a subject and an identifier of a group (e.g., group ID). The user intends to inquire progress stages associated with the subject for members in the group. The progress module 254 determines the subject and the group related to the subject from the inquiry data. The progress module 254 retrieves group data describing the group from the storage device 243 using the group ID and determines members in the group from the group data. The progress module 254 retrieves progress stages associated with the subject for the members in the group from the storage device 243 and provides the progress stages associated with the members in the group to the user.

For example, if a progress inquiry indicates that a user likes to know progress stages associated with a book for a reading group, the progress module 254 determines members in the reading group and retrieves progress data describing progress stages associated with the members in the reading group from the storage device 243. The progress module 254 instructs the presentation module 260 to present the progress stages associated with the reading group to the user.

The determination module 256 can be software including routines for determining spoilers from content data. In some instances, the determination module 256 can be a set of instructions executable by the processor 202 to provide the functionality described below for determining spoilers from content data. In some other instances, the determination module 256 can be stored in the memory 204 of the computing device 200 and can be accessible and executable by the processor 202. The determination module 256 may be adapted for cooperation and communication with the processor 202 and other components of the computing device 200 via signal line 234.

The determination module 256 determines spoilers for a first user from content data published by a second user as described below. In some instances, the first user and the second user may be members of a group associated with a subject. For example, the first user and the second user may be members of a reading group. In some instances, the first user and the second user may be connected via a social network. For example, the first user and the second users may be friends in a social network. In another example, the first user and the second user may follow each other in a social network. In some instances, the first user and the second user may be connected in a social graph or an interest graph.

In some instances, the determination module 256 receives, via the controller 252, content data (e.g., a message, a post, a comment, an email, etc.) published by a second user and determines a subject referred to in the content data. The determination module 256 retrieves a progress stage of the first user associated with the same subject from the storage device 243 and determines whether the content data includes a spoiler for the first user based at least in part on the progress stage. For example, assume the content data posted by the second user refers to a TV show. If a progress stage of the first user associated with the TV show indicates that the first user has not viewed the TV show yet, the determination module 256 determines that the content data from the second user may include a spoiler for the first user. However, if the progress stage of the first user associated with the TV show indicates that the first user has viewed the episodes of the TV show, the determination module 256 determines that the content data from the second user does not include spoilers for the first user.

In some instances, the determination module 256 determines whether the content data from the second user includes a spoiler for the first user by applying natural language processing techniques to the content data. For example, the determination module 256 parses the content data using natural language processing techniques (e.g., machine learning, etc.) and determines whether the content data includes spoilers based on the parsing results.

In some instances, the determination module 256 determines a subject referred to in the content data from the second user. The determination module 256 determines a first progress stage of the first user associated with the same subject from progress data retrieved from the storage 243. The determination module 256 also determines a second progress stage of the second user associated with the same subject from the content data. For example, the determination module 256 instructs the progress module 254 to determine a second progress stage of the second user from the content data. The determination module 256 determines whether the content data includes a spoiler for the first user by comparing the first progress stage of the first user to the second progress stage of the second user. For example, if the content data from the second user includes comments on a last chapter of a book, the determination module 256 determines a progress stage of the second user as: the second user has finished reading the book. A progress stage of the first user indicates that the first user may be reading a first chapter of the book. The determination module 256 compares the progress stages of the first user to the progress stage of the second user and determines that the content data may include a spoiler for the first user.

In some instances, the determination module 256 processes content data (e.g., posts, comments, etc.) published by the second user and determines whether the content data refers to a media topic (e.g., a movie, a video, an audio file, a book, etc.). If the content data refers to a media topic, the determination module 256 determines whether the content data from the second user include a spoiler for the first user by performing operations similar to those described above.

If the determination module 256 determines that the content data from the second user includes at least one spoiler for the first user, the determination module 256 sends a warning signal to the warning module 258. If the content data does not include spoilers for the first user, the determination module 256 instructs the presentation module 260 to present the content data to the first user.

The warning module 258 can be software including routines for generating spoiler warnings. In some instances, the warning module 258 can be a set of instructions executable by the processor 202 to provide the functionality described below for generating spoiler warnings. In some other instances, the warning module 258 can be stored in the memory 204 of the computing device 200 and can be accessible and executable by the processor 202. The warning module 258 may be adapted for cooperation and communication with the processor 202 and other components of the computing device 200 via signal line 236.

In some instances, the warning module 258 receives a warning signal from the determination module 256. The warning signal indicates that a spoiler for a first user may be included in the content data published by a second user. The warning module 258 obscures the corresponding content data responsive to the warning signal. For example, the warning module 258 hides the content data in a hidden section of a message before providing the message to the first user. In another example, the warning module 258 folds and/or conceals the content data before providing a notification of the content data to the first user.

In some instances, the warning module 258 generates a spoiler warning responsive to the warning signal and provides the spoiler warning to the first user. A spoiler warning includes data indicating that content data may include a spoiler. For example, the warning module 258 generates a message (e.g., a text message, an email, a voice mail, a dialog window, etc.) indicating that the content data may include a spoiler and instructs the presentation module 260 to present the message to the first user.

In some instances, the warning module 258 receives, via the controller 252, a request to show the obscured content data from the first user. The warning module 258 generates a spoiler warning for the first user and instructs the presentation module 260 to present the spoiler warning to the first user responsive to the request. For example, if the first user clicks on a hidden section of a message that includes obscured content data, the warning module 258 generates a spoiler warning and provides the spoiler warning to the first user. The spoiler warning may request the first user to confirm the viewing of the obscured content data. If the first user confirms to view the obscured content data even if the content data may include a spoiler, the warning module 258 instructs the presentation module 260 to present a full version of the content data to the first user.

The presentation module 260 can be software including routines for presenting data to users. In some instances, the presentation module 260 can be a set of instructions executable by the processor 202 to provide the functionality described below for presenting data to users. In some other instances, the presentation module 260 can be stored in the memory 204 of the computing device 200 and can be accessible and executable by the processor 202. The presentation module 260 may be adapted for cooperation and communication with the processor 202 and other components of the computing device 200 via signal line 238.

In some instances, the presentation module 260 presents one or more progress stages associated with a group to a user. For example, the presentation module 260 instructs the user interface module 262 to generate graphical data for providing a user interface depicting one or more progress indicators (e.g., progress bars) to a user. Examples of the user interface are depicted in FIGS. 6A-6D. The user may review the progress stages associated with the group via the user interface and requests for spoilers from other users in the group. For example, if a first user in the group has finished reading a book, a second user in the group may ask the first user to give a brief description of the story before reading the book.

In some instances, the presentation module 260 presents a spoiler warning to a user. For example, the presentation module 260 sends a message (e.g., a text message, an email, a voice mail, a notification, etc.) including a spoiler warning to the user. In some instances, the presentation module 260 presents the obscured content data in a hidden section of a message to a user. After receiving a confirmation signal from the user indicating that the user would like to view the obscured content data even if the content data may include a spoiler, the presentation module 260 presents an unobscured version of the content data to the user.

The user interface module 262 can be software including routines for generating graphical data for providing user interfaces to users. In some instances, the user interface module 262 can be a set of instructions executable by the processor 202 to provide the functionality described below for generating graphical data for providing user interfaces to users. In some other instances, the user interface module 262 can be stored in the memory 204 of the computing device 200 and can be accessible and executable by the processor 202. The user interface module 262 may be adapted for cooperation and communication with the processor 202 and other components of the computing device 200 via signal line 240.

In some instances, the user interface module 262 generates graphical data for providing a user interface that depicts progress stages of a group associated with a subject. The user interface module 262 sends the graphical data to a user device 115 operated by a user, causing the user device 115 to present the progress stages to the user via the user interface. In some instances, the user interface module 262 generates graphical data for providing a user interface that depicts a spoiler warning. The user interface module 262 sends the graphical data to a user device 115, causing the user device 115 to present the spoiler warning to the user via the user interface. Examples of the user interface are shown in FIGS. 6A-6D. The user interface module 262 may generate graphical data for providing other user interfaces to users.

Figure 3:
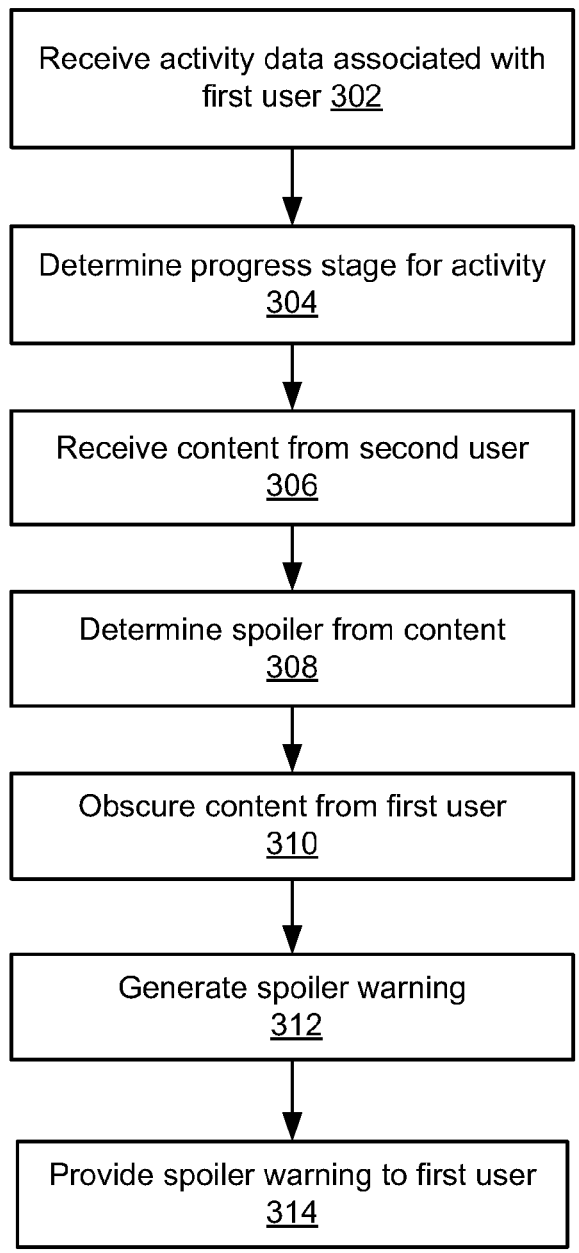
FIG. 3 is a flowchart of an example method for processing content spoilers.

Referring now to FIG. 3, an example of a method 300 for processing spoilers is described. In some instances, the controller 252 receives 302 activity data describing an activity associated with a first user. The progress module 254 determines 304 a progress stage of the first user associated with the activity based at least in part on the activity data. The controller 252 receives 306 content data from a second user. The determination module 256 determines 308 a spoiler for the first user from the content data based at least in part on the progress stage of the first user. The warning module 258 obscures 310 the content data published by the second user from the first user and generates 312 a spoiler warning indicating that the content data may include a spoiler for the first user. The presentation module 360 provides 314 the spoiler warning to the first user.

Figure 4A:
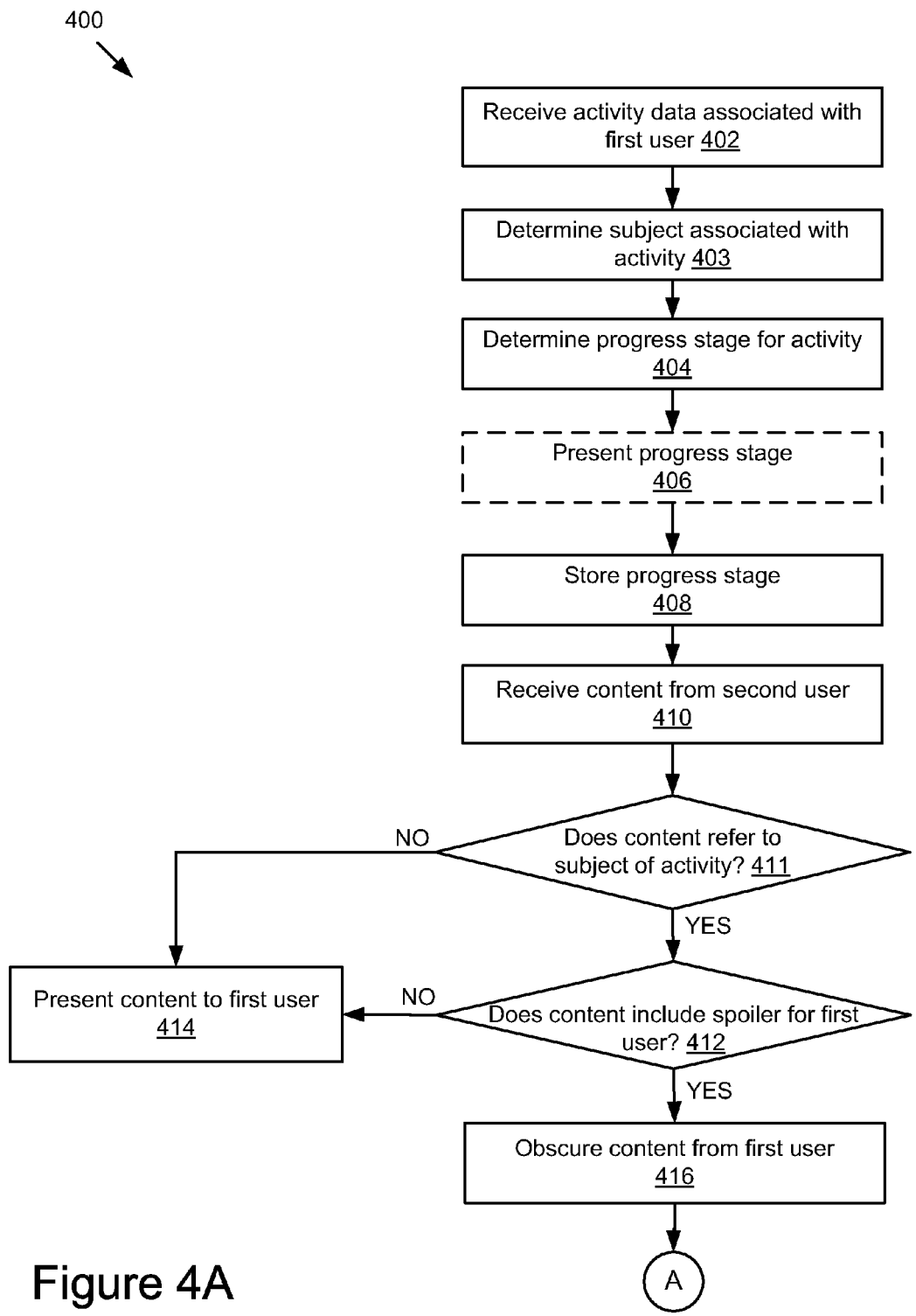
FIGS. 4A and 4B are flowcharts of another example method for processing content spoilers.
Figure 4B:
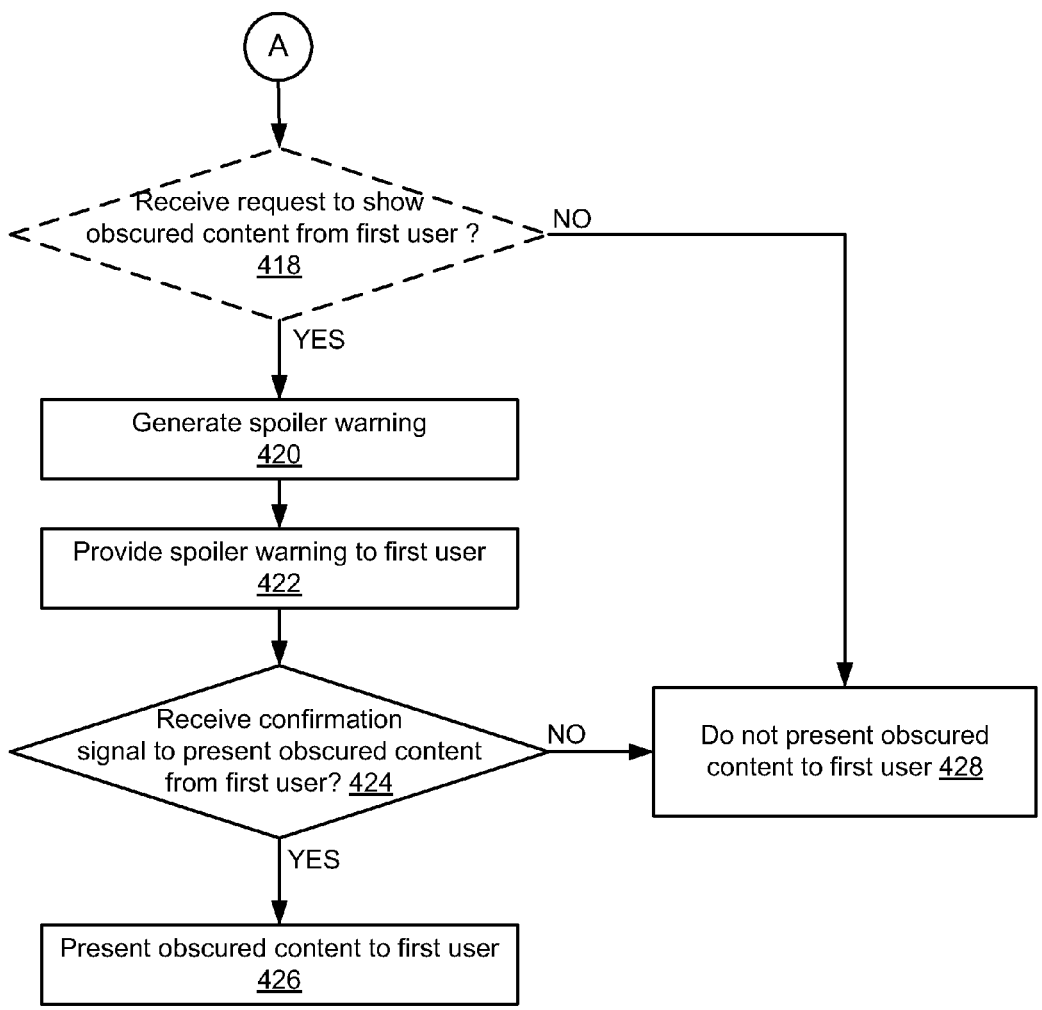

Referring now to FIGS. 4A and 4B, another example of a method 400 for processing spoilers is described. Turning to FIG. 4A, the controller 252 receives 402 activity data associated with a first user from a user device 115. The progress module 254 determines 403 a subject associated with the activity data. The progress module 254 determines 404 a progress stage of the first user associated with the subject based at least in part on the activity data. Optionally, the progress module 254 instructs the presentation module 260 to present 406 the progress stage to the first user. The progress module 254 stores the progress stage of the first user associated with the subject in the storage device 243.

In some instances, the controller 252 receives 410 content data published by a second user. The determination module 256 determines 411 whether the content data refers to the subject of the activity performed by the first user. If the content data does not refer to the subject, the determination module 256 instructs the presentation module 260 to present 414 the content data to the first user. If the content data refers to the subject of the activity, the determination module 256 determines 412 whether the content data includes a spoiler for the first user. If the content data does not include a spoiler for the first user, the determination module 256 instructs the presentation module 260 to present 414 the content data to the first user. If the content data includes a spoiler for the first user, the determination module 256 generates a warning signal and sends the warning signal to the warning module 258. The warning module 258 obscures 416 the content data published by the second user from the first user responsive to receiving the warning signal.

Turning to FIG. 4B, the controller 252 optionally determines 418 whether a request to show the obscured content data has been received from the first user. If the controller 252 does not receive the request, the presentation module 260 does not present 428 the obscured content data to the first user. If the controller 252 receives the request, the controller 252 sends the request to the warning module 258. The warning module 258 generates 420 a spoiler warning and instructs the presentation module 260 to provide 422 the spoiler warning to the first user. The controller module 252 determines 424 whether a confirmation signal to present the obscured content data has been received from the first user. If the controller 252 receives the confirmation signal, the controller 252 sends the confirmation signal to one or more of the warning module 258 and the presentation module 260. The presentation module 260 presents 426 a full version of the obscured content data to the first user. If the controller 252 does not receive the confirmation signal, the presentation module 260 may not present 428 the obscured content data to the first user.

Figure 5:
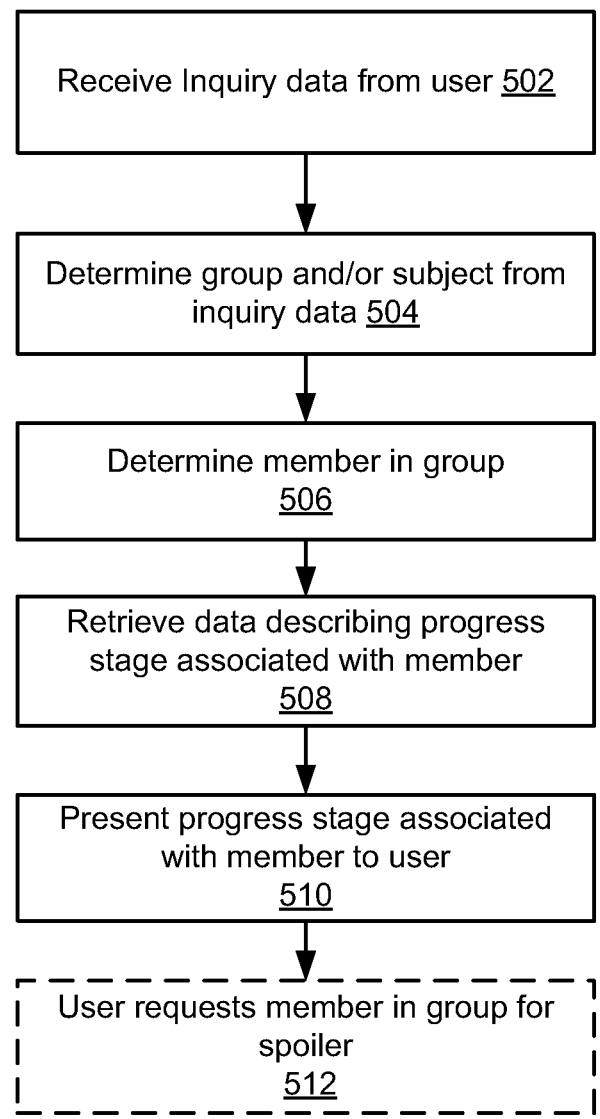
FIG. 5 is a flowchart of an example method for querying progress stages for users in a group.

Referring now to FIG. 5, an example of a method 500 for querying progress stages in a group is described. In some instances, the controller 252 receives 502 inquiry data describing a progress inquiry from a user. The progress module 254 determines 504 a group identifier identifying a group and/or a subject for the progress inquiry from the inquiry data. The progress module 254 determines 506 one or more members in the group. The progress module 254 retrieves 508 progress data describing one or more progress stages associated with the subject for the one or more members from the storage device 243. The progress module 254 sends the progress data to the presentation module 260. The presentation module 260 presents 510 the one or more progress stages associated with the one or more members in the group to the user. Optionally, the user may request 512 other members in the group for spoilers.

Figure 6A:
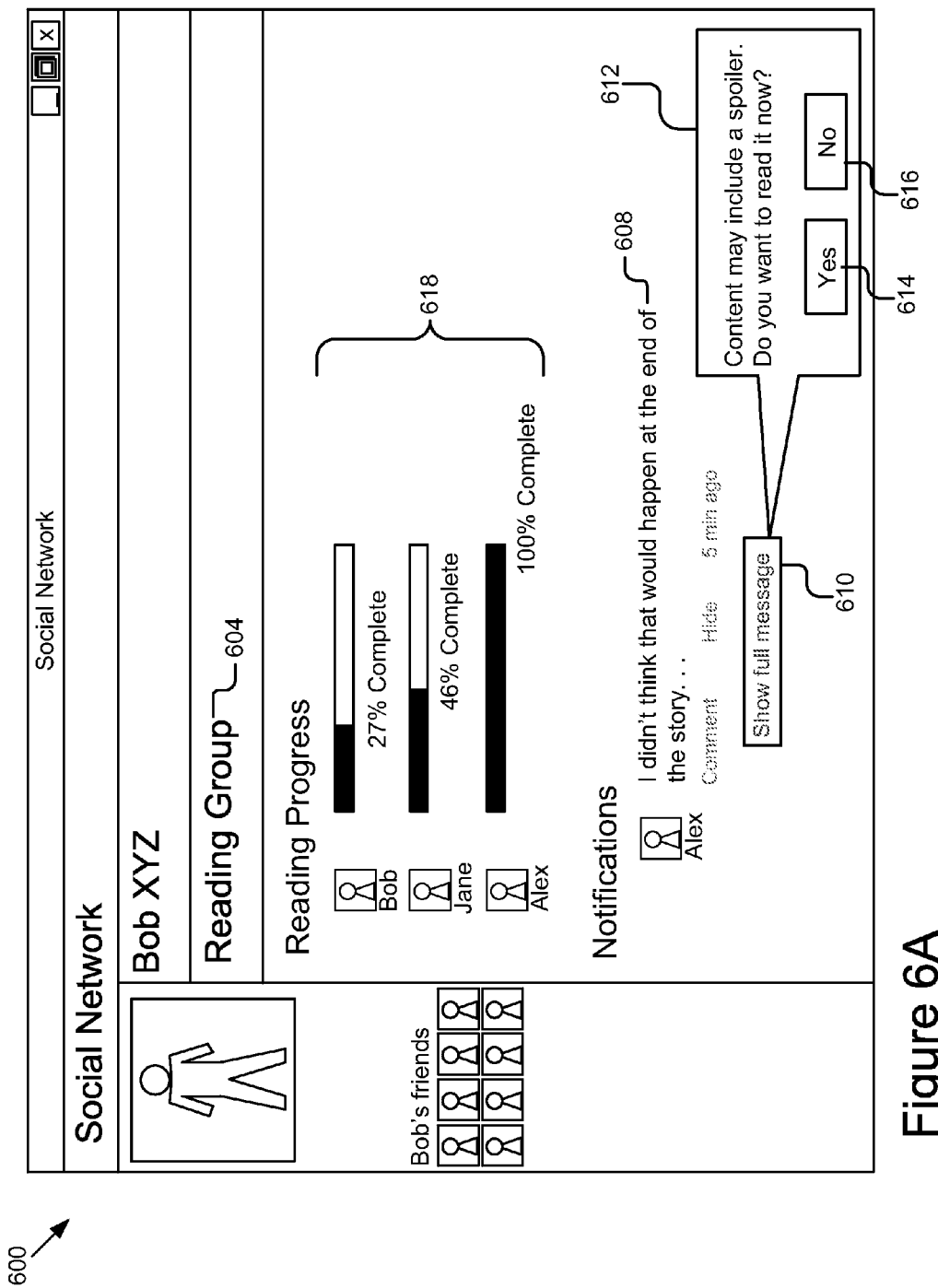
FIGS. 6A-6D are graphic representations of example user interfaces for processing content spoilers.

FIG. 6A is a graphic representation 600 of an example user interface for providing one or more progress stages and/or a spoiler warning to a user. In the illustrated implementation, the user interface includes a reading group 604. The user interface depicts one or more reading progress stages (e.g., one or more progress bars 618) for users Bob, Jane and Alex, respectively. The one or more progress bars 618 may be organized in an ascending order of the reading progress stages. The depicted user interface also includes a message 608 published by Alex. The message 608 may be obscured because it may include a spoiler for Bob. If Bob clicks on a "show full message" button 610, a spoiler warning 612 may be presented to Bob. If Bob clicks on a "Yes" button 614 to confirm the viewing of the obscured message 608, the user interface presents a full version of the obscured message 608 to Bob. If Bob clicks on a "No" button 616, the user interface does not present the obscured message 608 to Bob.

Figure 6B:
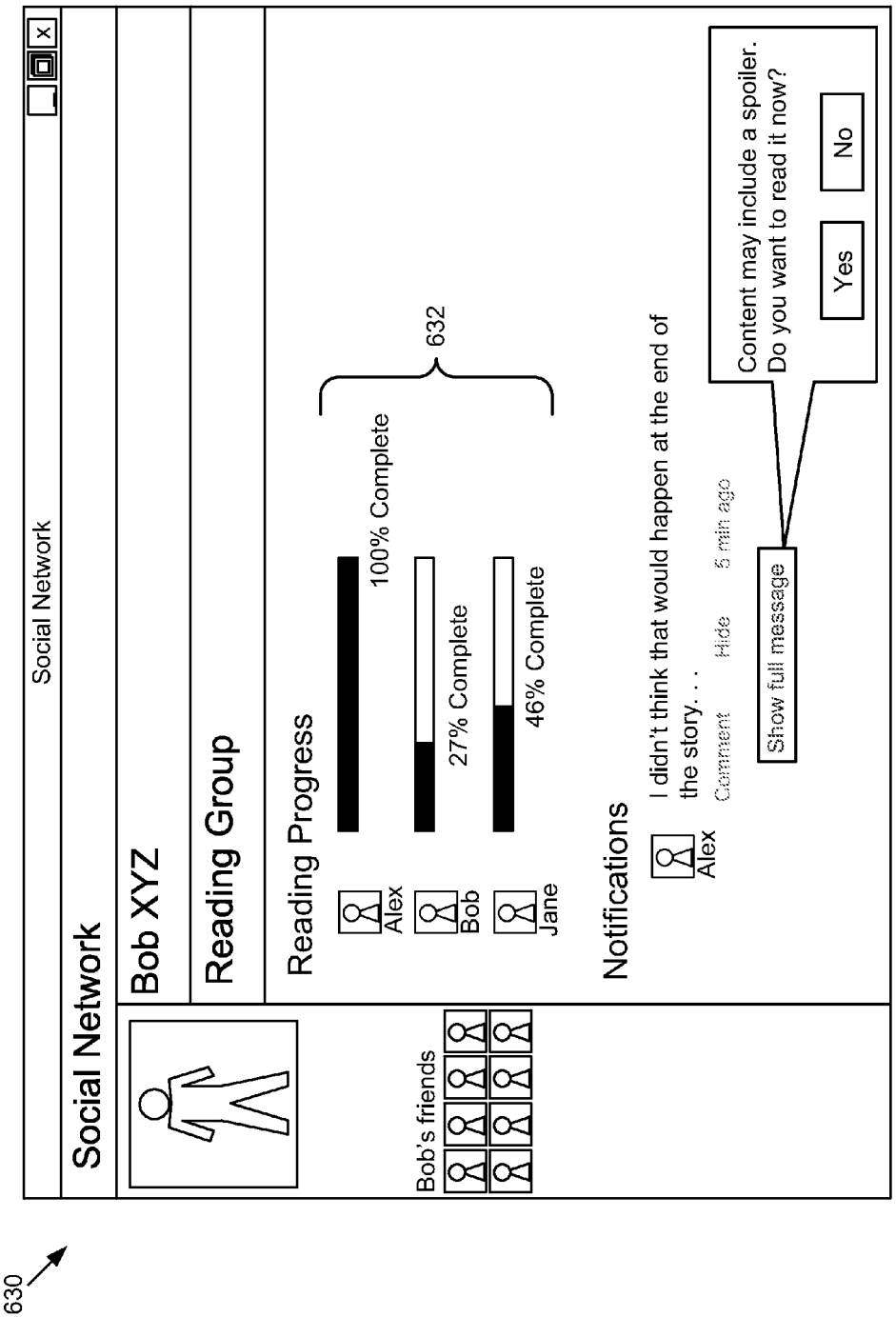

FIG. 6B is a graphic representation 630 of another example user interface for providing one or more progress stages and/or a spoiler warning to a user. In the illustrated implementation, the one or more progress bars 632 may be organized according to an alphabetic order of the names of the users.

Figure 6C:
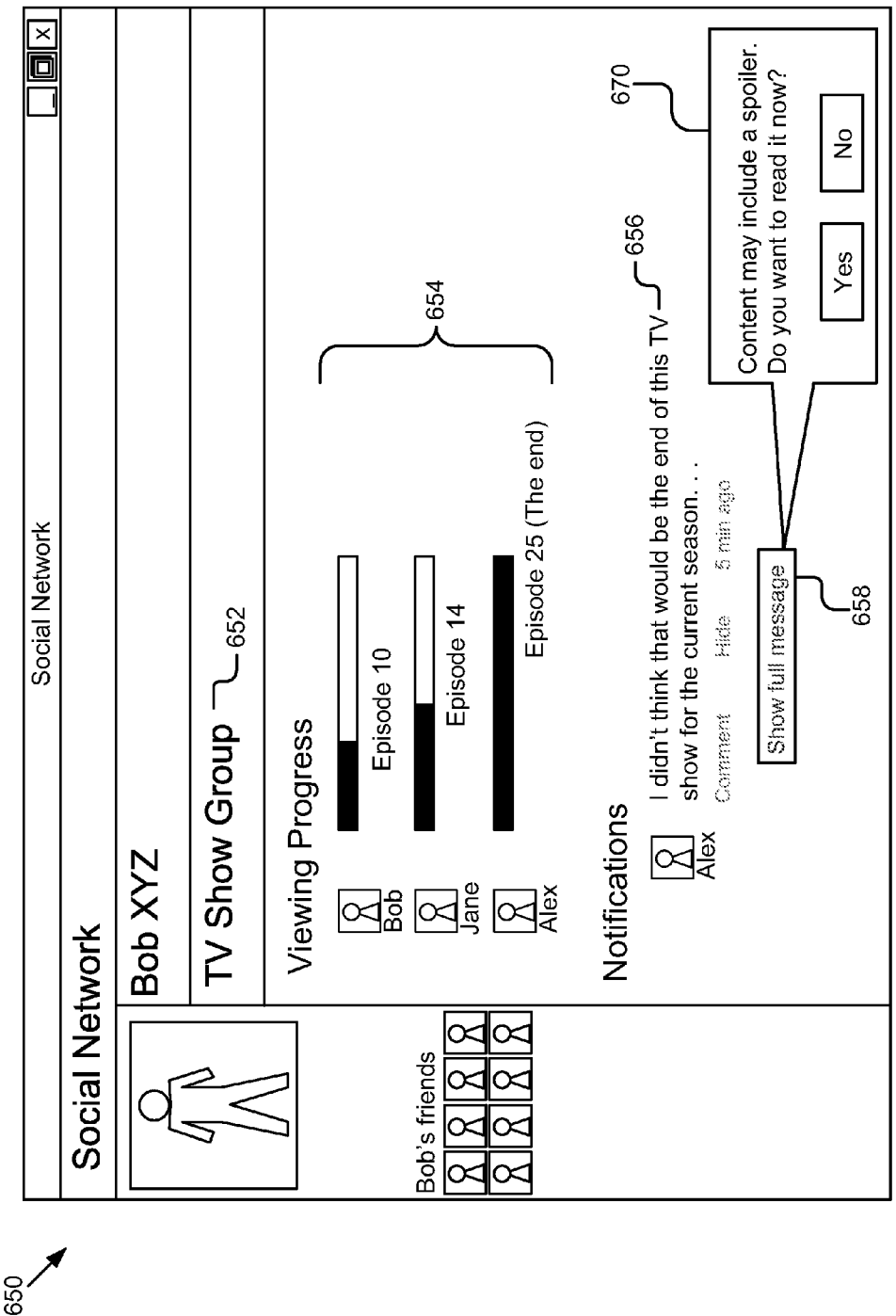

FIG. 6C is a graphic representation 650 of yet another example user interface for providing one or more progress stages and/or a spoiler warning to a user. In the illustrated implementation, the user interface includes a viewing group 652. In some instances, the viewing group 652 includes a group of users that views a series of videos (e.g., a television show with a plurality of episodes). In some instances, the viewing group 652 includes a group of users that views one or more movies. The user interface depicts one or more viewing progress stages (e.g., one or more progress bars 654) for example users Bob, Jane and Alex, respectively. In one embodiment, the one or more progress bars 654 are organized in an ascending order of the viewing progress stages. The depicted user interface also includes a message 656 published by Alex. The message 656 may be obscured because it may include a spoiler for Bob. If Bob clicks on a "show full message" button 658, a spoiler warning 670 may be presented to Bob.

Figure 6D:
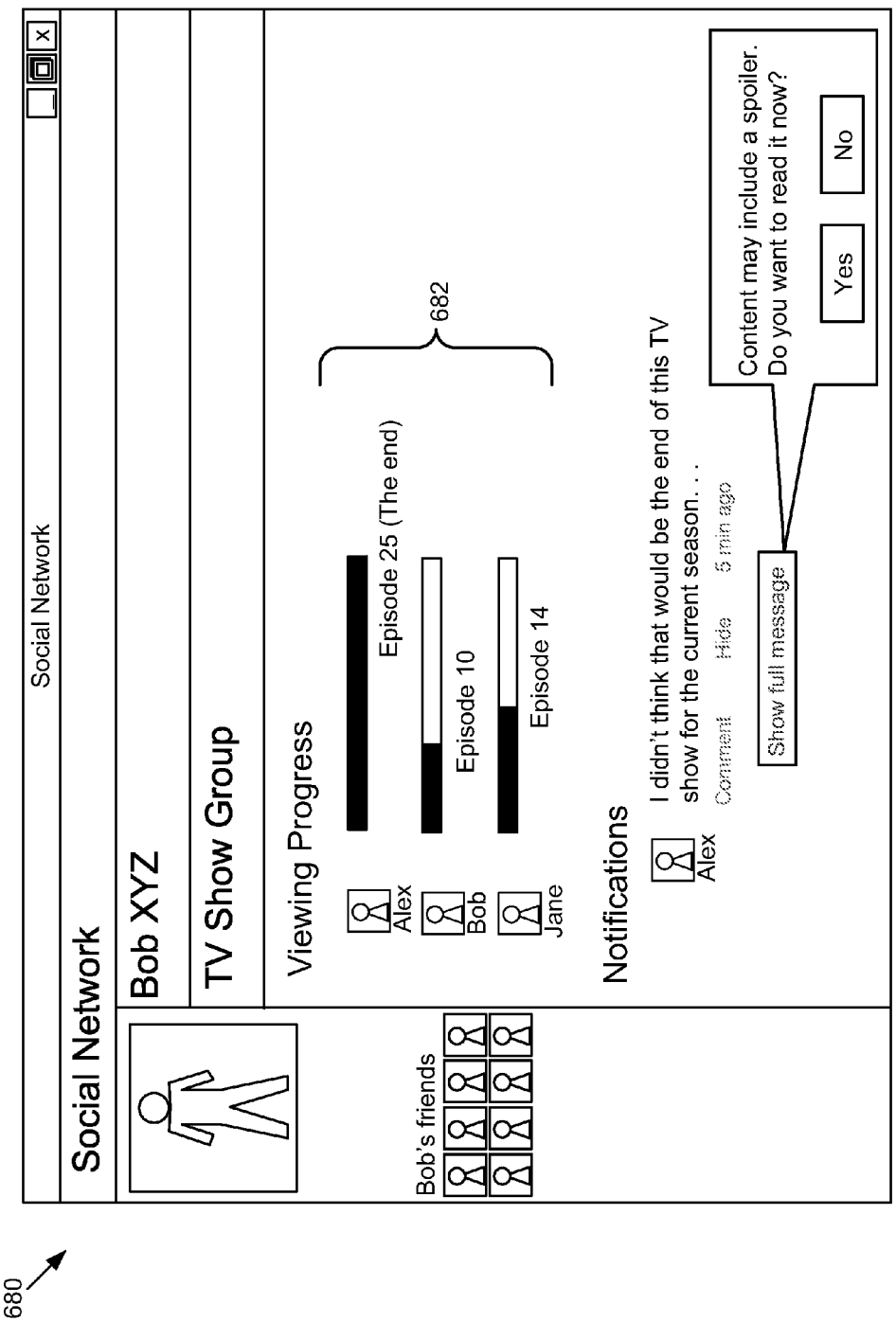

FIG. 6D is a graphic representation 680 of yet another example user interface for providing one or more progress stages and/or a spoiler warning to a user. In the illustrated implementation, the one or more progress bars 682 may be organized according to an alphabetic order of the names of the users.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving activity data describing an activity performed by a first user;
   determining a first progress stage for a subject associated with the activity based at least in part on the activity data;
   receiving content data published by a second user;
   determining whether the content data includes a spoiler for the first user based at least in part on the first progress stage;
   responsive to determining that the content data includes the spoiler, obscuring the content data published by the second user from the first user;
   generating a spoiler warning indicating that the obscured content data includes the spoiler; and
   providing the spoiler warning to the first user.

2. The method of claim 1, further comprising:
   receiving input data from the first user describing the subject and the first progress stage associated with the activity; and
   configuring the first progress stage and the subject for the activity based at least in part on the input data.

3. The method of claim 1, further comprising:
  receiving inquiry data from the first user to request a second progress stage of the subject associated with the second user;
  retrieving data describing the second progress stage associated with the second user responsive to receiving the inquiry data; and
  presenting the second progress stage to the first user.

4. The method of claim 1, further comprising:
  receiving a confirmation signal responsive to the spoiler warning from the first user, the confirmation signal indicating that the first user confirms to view the obscured content data; and
  presenting the obscured content data to the first user.

5. The method of claim 1, further comprising:
  presenting a progress indicator indicating the first progress stage of the first user to one or more of the first user and the second user.

6. The method of claim 1, wherein the first user and the second user are members of a group related to the subject.

7. The method of claim 1, wherein determining whether the content data includes the spoiler comprises:
  determining whether the content data refers to the subject of the activity;
  responsive to determining that the content data refers to the subject, determining a second progress stage for the subject from the content data; and
  determining whether the content data includes the spoiler by comparing the first progress stage associated with the activity to the second progress stage associated with the content data.

8. A computer program product comprising a non-transitory computer usable medium including a computer readable program, wherein the computer readable program when executed on a computer causes the computer to:
  receive activity data describing an activity performed by a first user;
  determine a first progress stage for a subject associated with the activity based at least in part on the activity data;
  receive content data published by a second user;
  determine whether the content data includes a spoiler for the first user based at least in part on the first progress stage;
  responsive to determining that the content data includes the spoiler, obscure the content data published by the second user from the first user;
  generate a spoiler warning indicating that the obscured content data includes the spoiler; and
  provide the spoiler warning to the first user.

9. The computer program product of claim 8, wherein the computer readable program when executed on the computer causes the computer to also:
  receive input data from the first user describing the subject and the first progress stage associated with the activity; and
  configure the first progress stage and the subject for the activity based at least in part on the input data.

10. The computer program product of claim 8, wherein the computer readable program when executed on the computer causes the computer to also:
  receive inquiry data from the first user to request a second progress stage of the subject associated with the second user;
  retrieve data describing the second progress stage associated with the second user responsive to receiving the inquiry data; and
  present the second progress stage to the first user.

11. The computer program product of claim 8, wherein the computer readable program when executed on the computer causes the computer to also:
  receive a confirmation signal responsive to the spoiler warning from the first user, the confirmation signal indicating that the first user confirms to view the obscured content data; and
  present the obscured content data to the first user.

12. The computer program product of claim 8, wherein the computer readable program when executed on the computer causes the computer to also:
  present a progress indicator indicating the first progress stage of the first user to one or more of the first user and the second user.

13. The computer program product of claim 8, wherein the first user and the second user are members of a group related to the subject.

14. The computer program product of claim 8, wherein determining whether the content data includes the spoiler comprises:
  determining whether the content data refers to the subject of the activity;
  responsive to determining that the content data refers to the subject, determining a second progress stage for the subject from the content data; and
  determining whether the content data includes the spoiler by comparing the first progress stage associated with the activity to the second progress stage associated with the content data.

15. A system comprising:
  a controller stored on a memory and executable by one or more processors, the controller configured to receive activity data describing an activity performed by a first user and content data published by a second user;
  a progress module stored on the memory and executable by the one or more processors, the progress module communicatively coupled to the controller and configured to determine a first progress stage for a subject associated with the activity based at least in part on the activity data;
  a determination module stored on the memory and executable by the one or more processors, the determination module communicatively coupled to the progress module and the controller, the determination module configured to determine whether the content data includes a spoiler for the first user based at least in part on the first progress stage;
  a warning module stored on the memory and executable by the one or more processors, the warning module communicatively coupled to the determination module, responsive to the determination that the content data includes the spoiler the warning module configured to obscure the content data published by the second user from the first user and generate a spoiler warning indicating that the obscured content data includes the spoiler; and
  a presentation module stored on the memory and executable by the one or more processors, the presentation module communicatively coupled to the warning module and the progress module, the presentation module configured to provide the spoiler warning to the first user.

16. The system of claim 15, wherein:
  the controller is further configured to receive input data from the first user describing the subject and the first progress stage associated with the activity; and the progress module is further configured to configure the first progress stage and the subject for the activity based at least in part on the input data.

17. The system of claim 15, wherein:
the controller is further configured to receive inquiry data from the first user to request a second progress stage of the subject associated with the second user;
the progress module is further configured to retrieve data describing the second progress stage associated with the second user responsive to receiving the inquiry data; and
the presentation module is further configured to present the second progress stage to the first user.

18. The system of claim 15, wherein:
the controller is further configured to receive a confirmation signal responsive to the spoiler warning from the first user, the confirmation signal indicating that the first user confirms to view the obscured content data; and
the presentation module is further configured to present the obscured content data to the first user.

19. The system of claim 15, wherein:
the presentation module is further configured to present a progress indicator indicating the first progress stage of the first user to one or more of the first user and the second user.

20. The system of claim 15, wherein the first user and the second user are members of a group related to the subject.

* * * * *